(12) United States Patent
Hurel

(10) Patent No.: US 10,259,301 B2
(45) Date of Patent: Apr. 16, 2019

(54) REMOVABLE CONVERTIBLE TOP FOR CONVERTIBLE VEHICLE

(71) Applicant: BLUECAR, Puteaux (FR)

(72) Inventor: Benoit Hurel, Voisins le Bretonneux (FR)

(73) Assignee: BLUECAR, Puteaux (FR)

(*) Notice: Subject to any disclaimer, the term of this patent is extended or adjusted under 35 U.S.C. 154(b) by 0 days.

(21) Appl. No.: 15/516,365

(22) PCT Filed: Oct. 1, 2015

(86) PCT No.: PCT/EP2015/072738
§ 371 (c)(1),
(2) Date: Mar. 31, 2017

(87) PCT Pub. No.: WO2016/050935
PCT Pub. Date: Apr. 7, 2016

(65) Prior Publication Data
US 2017/0297421 A1    Oct. 19, 2017

(30) Foreign Application Priority Data

Oct. 3, 2014 (FR) ...................... 14 59512

(51) Int. Cl.
*B60J 7/12* (2006.01)
*B60J 7/10* (2006.01)
*B60J 10/90* (2016.01)

(52) U.S. Cl.
CPC ................ *B60J 7/123* (2013.01); *B60J 7/10* (2013.01); *B60J 7/104* (2013.01); *B60J 7/1291* (2013.01); *B60J 10/90* (2016.02)

(58) Field of Classification Search
CPC ........ B60J 7/123; B60J 7/1239; B60J 7/1234; B60J 7/126; B60J 7/1291
(Continued)

(56) References Cited

U.S. PATENT DOCUMENTS 3,348,877 A * 10/1967 Caramanna ................ B60J 7/10
                                                                    135/115
3,476,437 A * 11/1969 Tomala ...................... B60J 7/10
                                                                    280/748
(Continued)

FOREIGN PATENT DOCUMENTS

EP   2364869 A1    9/2011
FR   2985950 A3 *  7/2013

OTHER PUBLICATIONS

International Search Report dated Nov. 30, 2015, PCT Application No. PCT/EP2015/072738.
(Continued)

*Primary Examiner* — Jason S Morrow
(74) *Attorney, Agent, or Firm* — Womble Bond Dickinson (US) LLP

(57) ABSTRACT

A removable convertible top for a convertible vehicle. The convertible top includes a flexible water-tight canvas provided with longitudinal reinforcements, the ends of which are suitable for resting on the bars of a vehicle; curved rigid side reinforcements, arranged on the opposite sides of the canvas, parallel to the longitudinal reinforcements, and respectively provided with sets of hooks for engaging with complementary coupling structures provided on the vehicle. The canvas and side reinforcements interlock to automatically tension the canvas, when the two sets of hooks interlock with the coupling structures.

18 Claims, 8 Drawing Sheets

Figure 5:
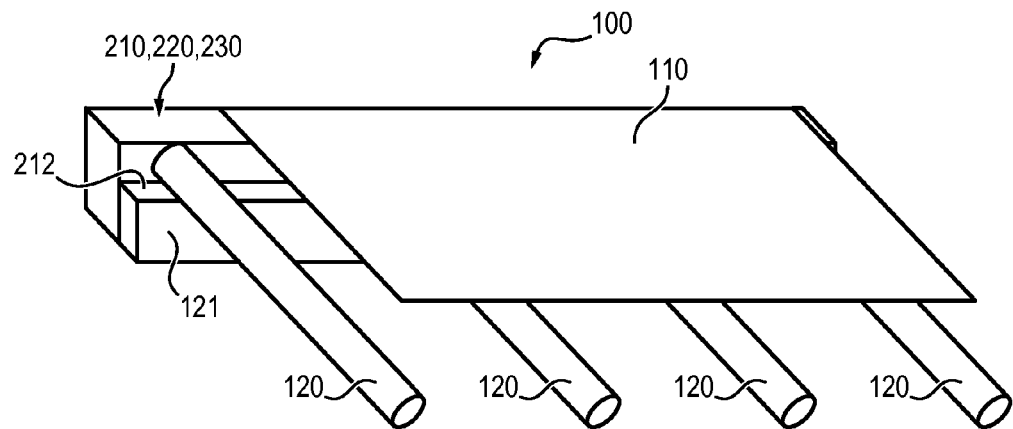

(58) Field of Classification Search
USPC .................. 296/107.09, 107.12, 107.11, 219
See application file for complete search history.

(56) References Cited

U.S. PATENT DOCUMENTS

| | | | |
|---|---|---|---|
| 2005/0280290 A1* | 12/2005 | Urban ........................ | B60J 1/14 296/219 |
| 2005/0280292 A1* | 12/2005 | Reitzloff .................... | B60J 1/14 296/219 |
| 2008/0143151 A1* | 6/2008 | Dunneback ............ | B60J 7/0053 296/219 |
| 2011/0221228 A1* | 9/2011 | Cimatti ..................... | B60J 7/10 296/107.09 |

OTHER PUBLICATIONS

French Search Report with English Language Translation Cover Sheet dated May 20, 2015, FR Application No. 1459512.

* cited by examiner

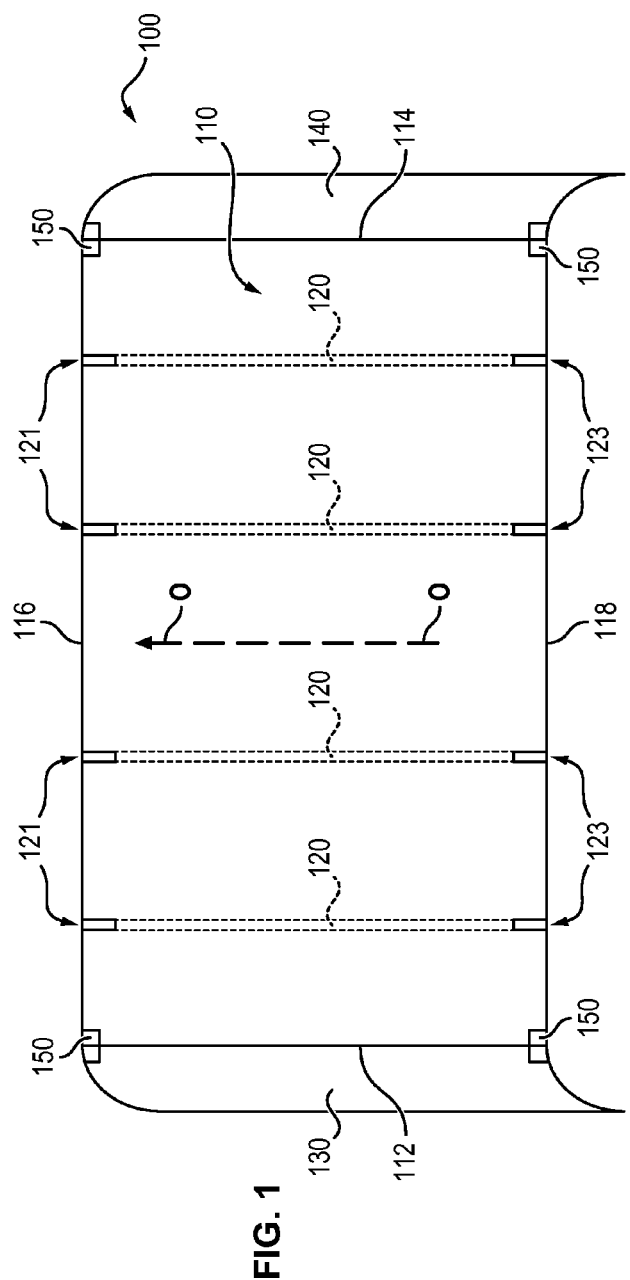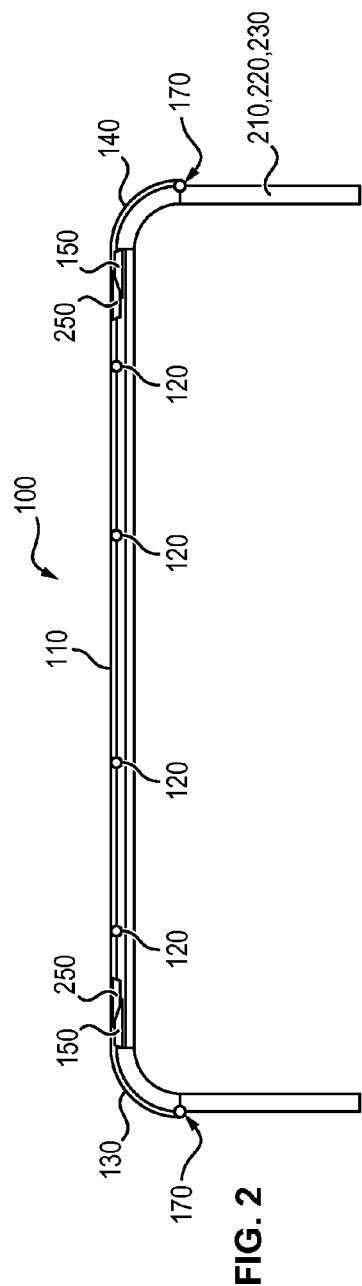

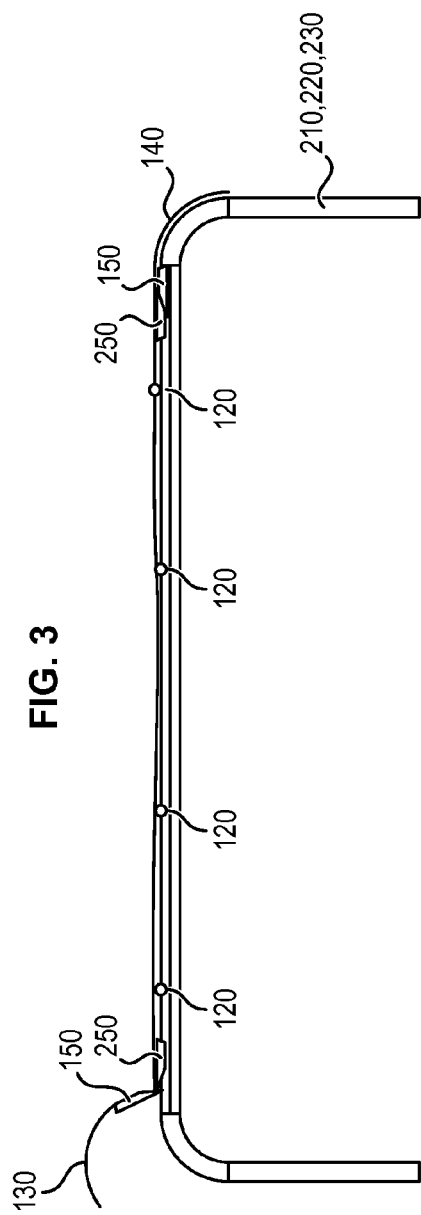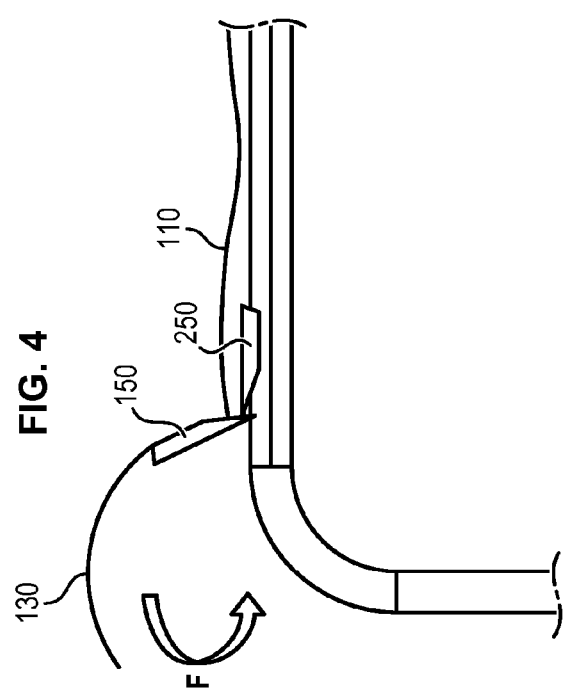

REMOVABLE CONVERTIBLE TOP FOR CONVERTIBLE VEHICLE

This invention relates to the field of removable convertible tops for vehicles, particularly but not exclusively of cabriolet or so-called beach car type.

Many devices forming removable convertible tops have already been proposed.

For example, in France a convertible top is known for old vehicles of Citroën 2CV type, which is rolled from front to back.

A convertible top is also known that can be concertina folded along two parallel rails on the longitudinal sides of the roof of the vehicle, the convertible top folding from the front to the back in transverse folds, for vehicles of Citroën C3 type.

There are moreover many patents describing solutions for removable convertible tops for convertible vehicles. By way of non-limiting example the document FR 2934207 may be mentioned. This document describes a flexible roof with ribs made of a material containing piezoelectric fibers. The ends of the ribs are hooked onto the structure of the vehicle to hold them in place.

The document EP 1112881, which describes a system for attaching a folding roof by hooking, may also be mentioned.

The various solutions proposed until now do not always provide full satisfaction, however.

In particular it can happen that, in many cases, the convertible top in place juts out above the roof of the vehicle, giving rise to rocking and hindering the installation of any roof bars or a roof rack. Known convertible tops can float when the vehicle is driven, causing loud banging and preventing the vehicle from being rainproof.

It should also be noted that the mechanism described in the aforementioned document EP 1112881 is complex and expensive.

In this context, the aim of the present invention is to present new means for improving the situation compared to the prior art.

This aim is achieved according to the invention owing to a removable convertible top for a convertible vehicle, including:
- a flexible sealing canvas provided with longitudinal reinforcements, the ends of which are adapted for resting on bars of a vehicle,
- rigid curved lateral reinforcements, arranged on the opposite sides of the canvas, parallel to the longitudinal reinforcements, and respectively provided with sets of hooks adapted for cooperating with complementary hooking structures provided on the vehicle, said canvas and said lateral reinforcements cooperating so as to automatically tension the canvas, by elastically tensioning the portion of the canvas located between the two sets of hooks, when these two sets of hooks are engaged with the hooking structures provided on the vehicle.

Those skilled in the art will understand that the structure of the invention, particularly the fact of providing the hooking means not on the ends of the longitudinal reinforcements, as recommended in the document FR 2934207, but on opposite sides of the convertible top, the sides being parallel to the longitudinal reinforcements, makes it possible, owing to the elasticity of the portion of canvas located between the two hooking sets placed on the opposite sides, to automatically tension the canvas simultaneously with the operation of hooking the canvas, and thus to avoid any floating during driving.

Figure 6:
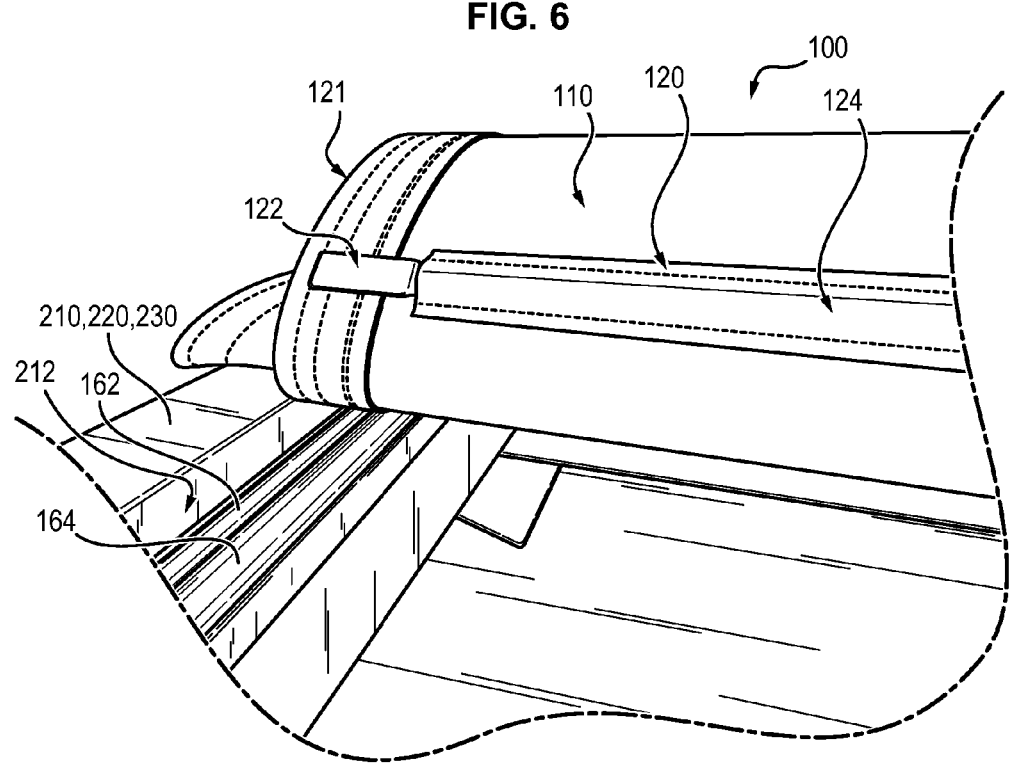
Figure 7:
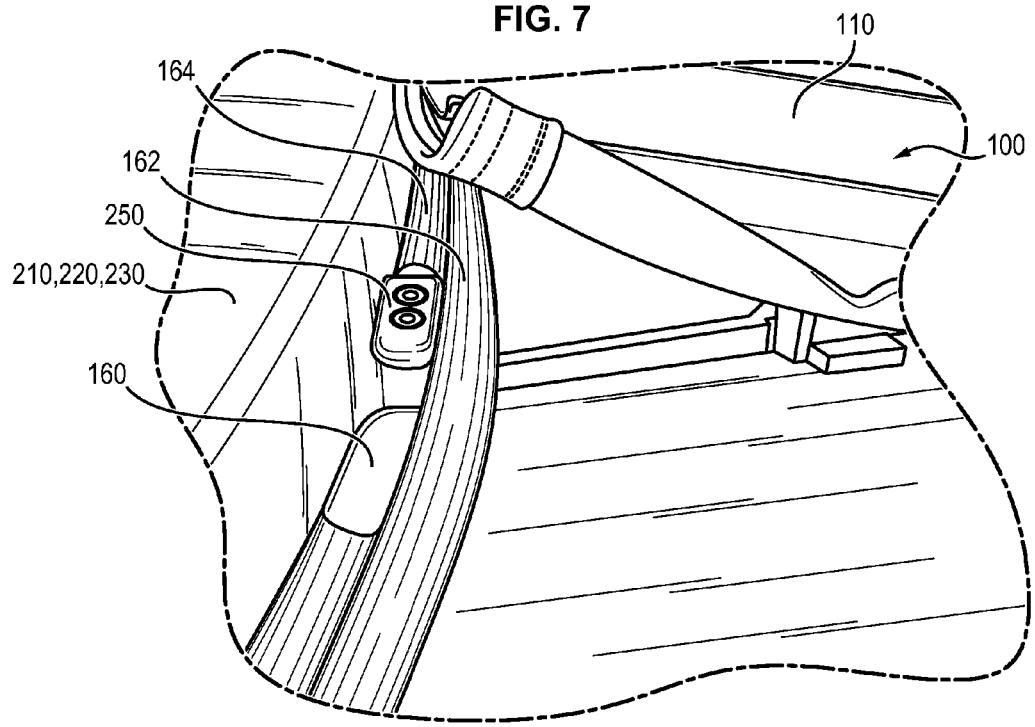
Figure 8:
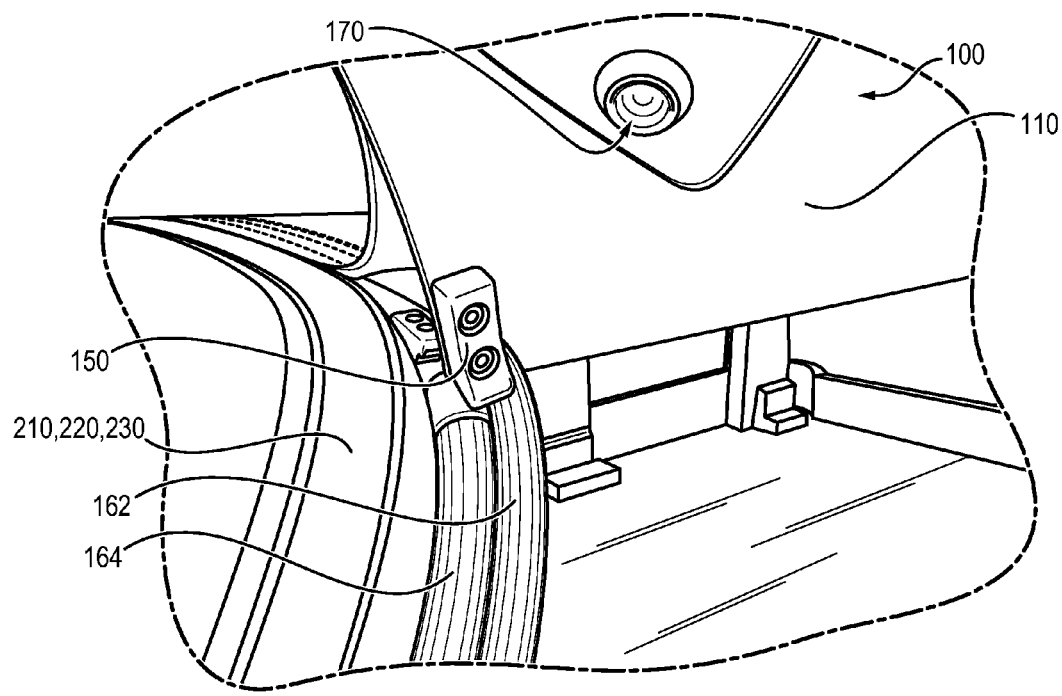
Figure 9:
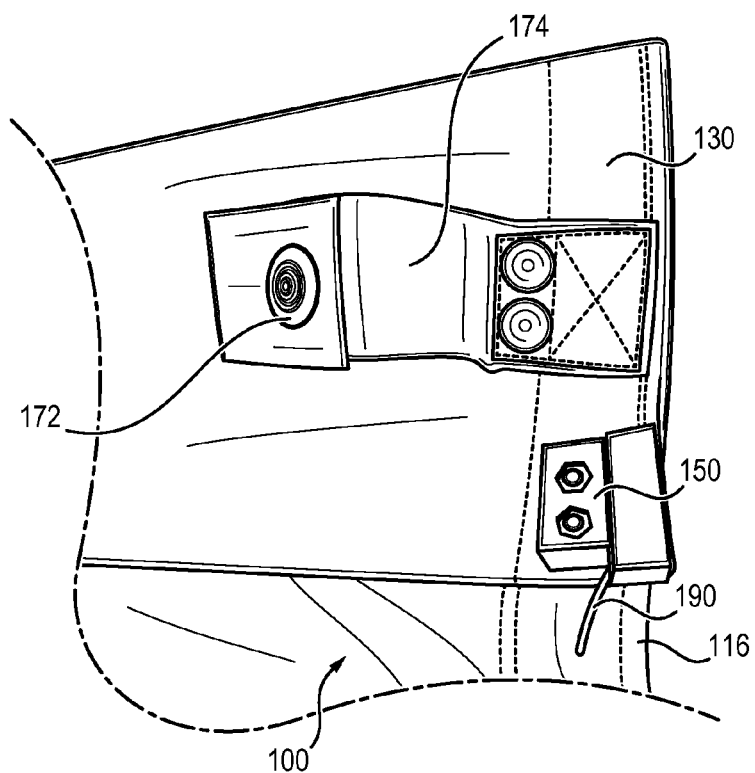
Figure 10:
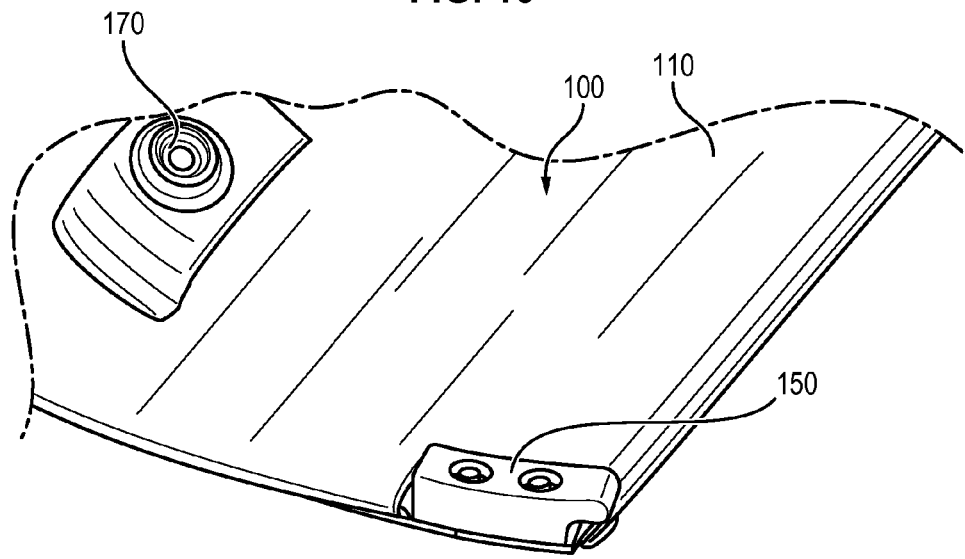
Figure 11:
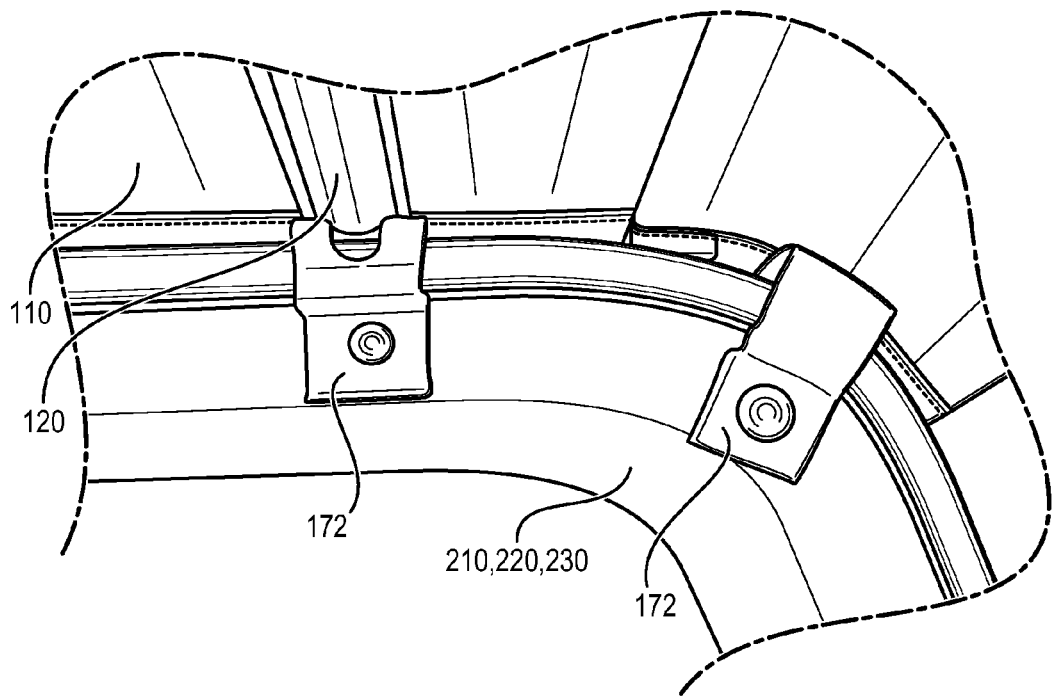
Figure 12:
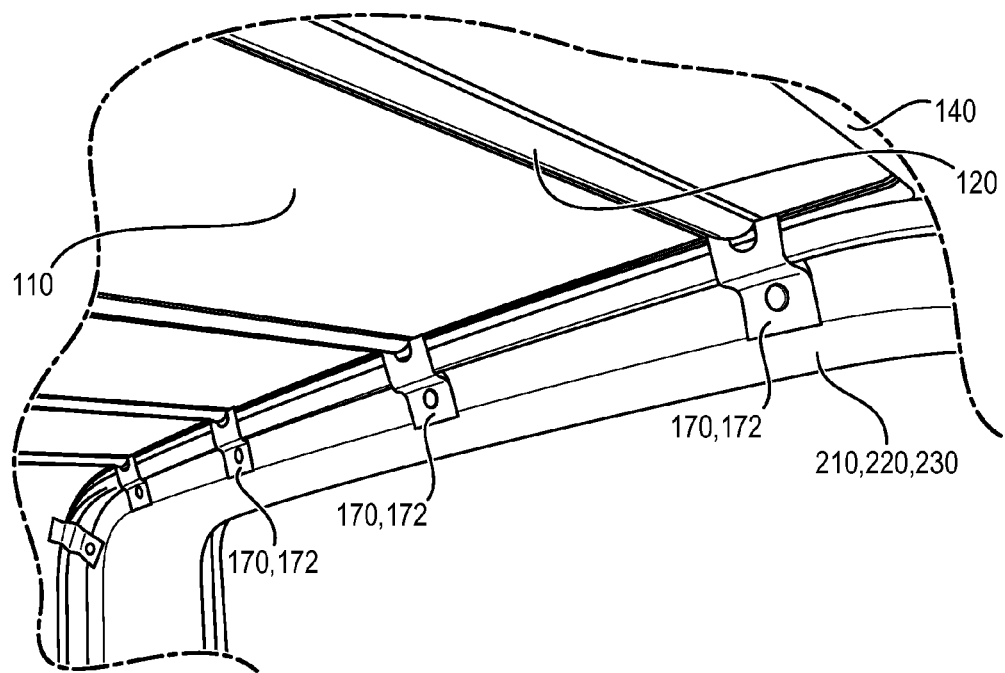
Figure 13:
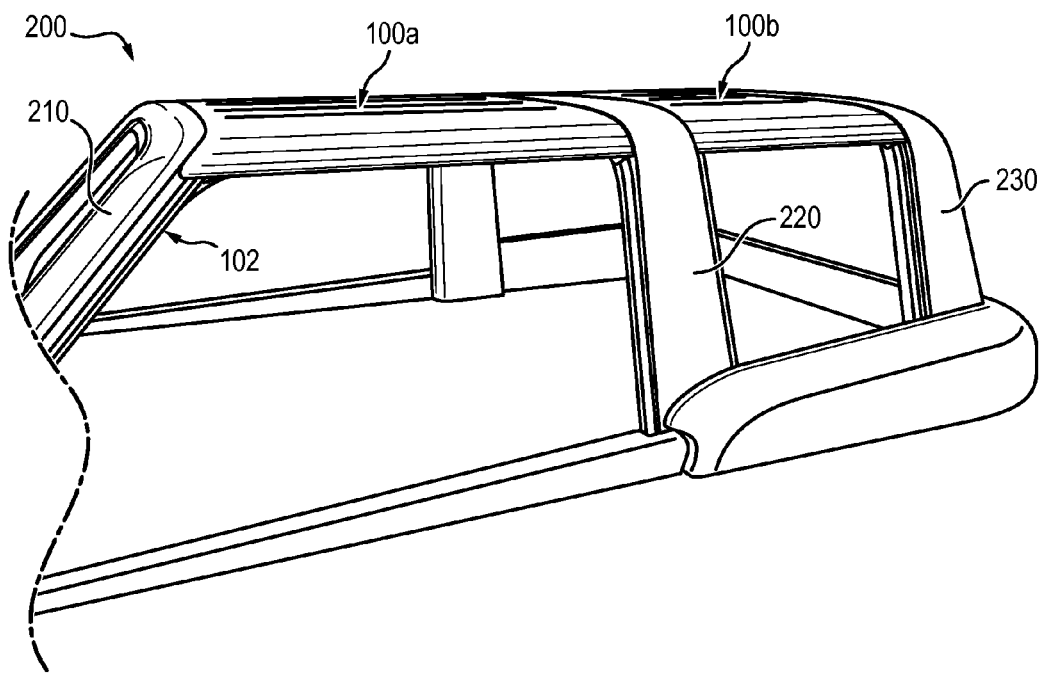
Figure 14:
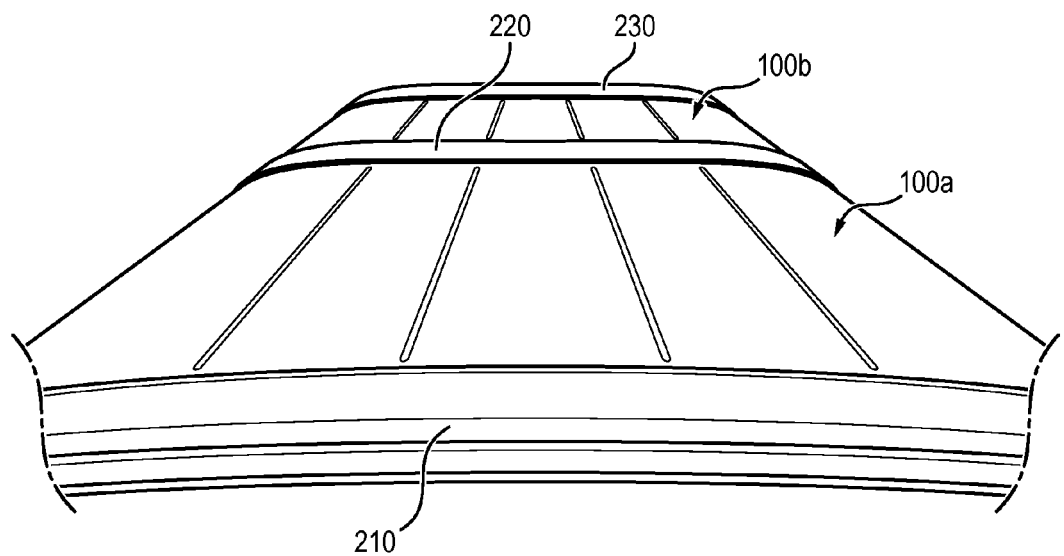
Figure 15:
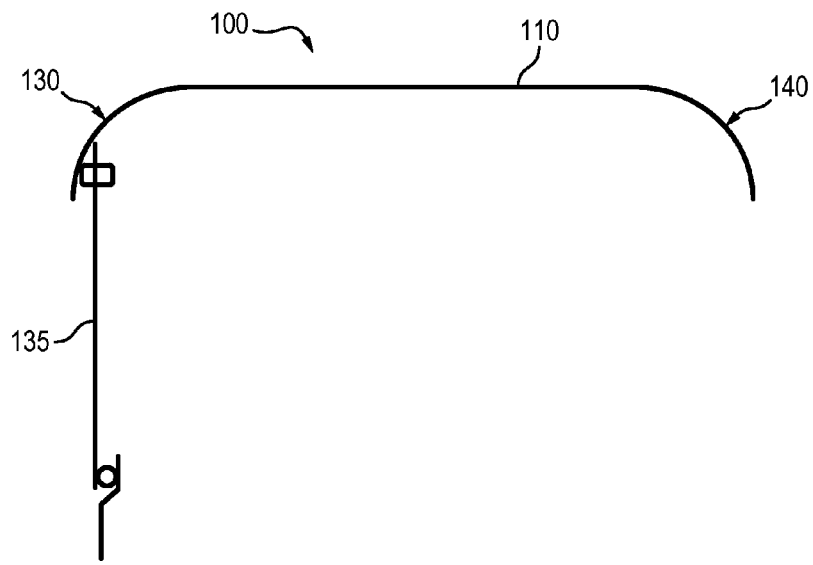
Figure 16:
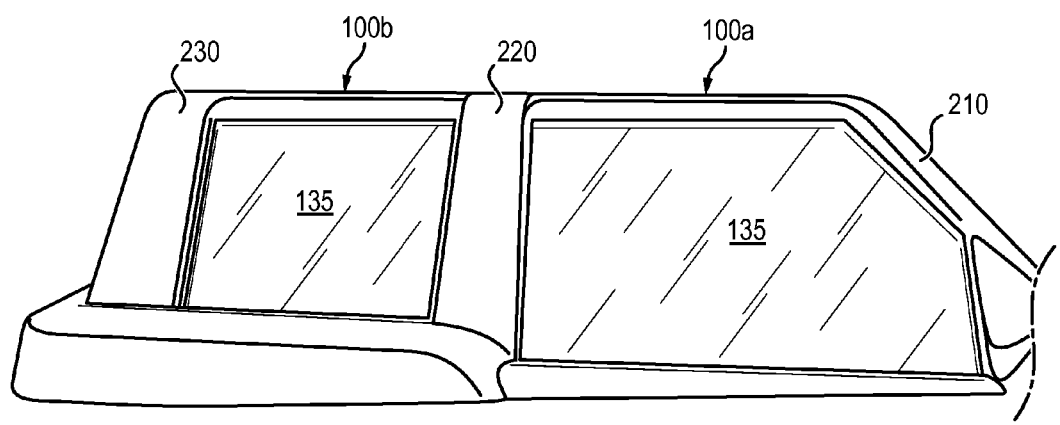

Other features, aims and advantages of the invention will become apparent upon reading the following detailed descriptions, with reference to the appended drawings, given by way of non-limiting example, and wherein:

FIG. 1 represents a schematic top perspective view of a removable convertible top in accordance with a preferred embodiment of the present invention, FIG. 2 represents a similar end view of the same convertible top in place on a vehicle structure, FIG. 3 represents a similar view to FIG. 2, just before the tensioning of the canvas, FIG. 4 represents a magnified view of an edge of the convertible top, illustrating cooperation between the hooks for the tensioning, FIG. 5 schematically illustrates cooperation existing between the ends of the longitudinal reinforcements of the removable convertible top and a vehicle bar, FIG. 6 represents a view of a removable convertible top in accordance with the present invention, partly rolled in place on a vehicle, FIG. 7 represents a detail view of hooking and sealing means in accordance with the invention, FIG. 8 represents a detail view of means of complementary attachment of the removable convertible top, FIG. 9 represents another detail view of another means of complementary attachment of the removable convertible top, FIG. 10 represents a detail view of other means of complementary attachment of the removable convertible top in accordance with the present invention, FIG. 11 illustrates another means for attaching the convertible top onto the bars of the vehicle by Tenax (trademark) button, FIG. 12 illustrates a particular method of attachment with straps under the canvas of the convertible top, distributed along the bar, FIGS. 13 and 14 represent a view of a vehicle in accordance with a particular embodiment of the invention comprising two removable convertible tops, FIG. 15 represents an end view of a convertible top in accordance with a particular embodiment of the invention comprising a transparent lateral flap protecting the passengers, FIG. 16 represents a lateral view of such a variant embodiment.

The appended FIGS. 1 to 12 represent exemplary embodiments of a removable vehicle convertible top in accordance with the present invention, bearing the general reference number 100.

This convertible top comprises a flexible canvas 110, air- and liquid-tight. The outline of the canvas 110 is adapted to the shape of the vehicle in question. The canvas is thus of a generally rectangular shape comprising two lateral edges 112, 114 that are mutually parallel and parallel to the longitudinal direction O-O of the vehicle, and two transverse edges, front 116 and back 118 respectively, that are mutually parallel.

The canvas 110 can also be formed, for example and in a non-limiting manner, from a sheet of thermoplastic material or a plasticized canvas or a woven canvas, etc.

The convertible top 100 is equipped with a plurality of parallel longitudinal reinforcements 120. According to the particular non-limiting embodiment represented in the figures, four reinforcements 120 are also provided, mutually parallel and parallel to the axis O-O.

Each longitudinal reinforcement 120 runs the whole length of the canvas 110 so that the ends 121, 123 of the reinforcements 120 are located at the front 116 and rear 118 transverse edges. The front 121 and rear 123 ends of the longitudinal reinforcements 120 are adapted for resting on the edge of the upper bars. These upper bars each extend transversally to the longitudinal direction of the vehicle. In FIG. 13, which shows a sketch of a vehicle 200, such bars are for example represented by reference numbers 210, 220 and 230, the vehicle in question being adapted for receiving two removable convertible tops as will be detailed further on.

Yet more precisely, as seen in FIG. 5, preferably, according to the invention, each of the support bars 210, 220, 230 includes a step 212 of a height at least equal to the local thickness of the associated end of the lateral reinforcements 120, so that the ends 121, 123 of the longitudinal reinforcements 120 and the associated canvas 110, i.e. the whole thickness of the convertible top 100, is not thicker, in order to substantially form a vehicle roof of substantially planar shape (FIGS. 2, 13 and 14).

For this purpose, the ends 121, 123 of the longitudinal reinforcements 120 can be flattened as illustrated in FIG. 6, with the reference number 122.

The longitudinal reinforcements 120 can be made of any appropriate rigid material. This can be a O-ring made of metal or composite material. These longitudinal reinforcements 120 are connected to the canvas 110 by any appropriate means, for example by sewing or enclosing in longitudinal channels formed by bonding or sewing of a longitudinal strip 124 attached under the canvas 110, as illustrated in FIG. 6.

The longitudinal reinforcements 120 and the associated connection means are preferably placed under the lower face of the canvas 110.

As seen in FIG. 6, the seam or strip 124 forming a support for the longitudinal reinforcements 120 is limited in length, so that each reinforcement 120, and at each end, its flattened part 122 emerges to rest on the aforementioned step 212.

The canvas 110, and consequently the convertible top 100, is pre-formed to follow the shape of the front windshield and the pillars of the vehicle on which they are intended to be installed. As illustrated for example in FIG. 13, the convertible top 100 is particularly adapted in shape to the tilted front part, with reference number 102 in FIG. 13, of the windshield pillar, corresponding to the bar 210 in FIG. 13.

As an example represented in FIGS. 13 and 14, the vehicle comprises a bar 210 surrounding the windshield, a rear bar 230 delimiting the rear of the upper structure of the vehicle, for example surrounding the rear window or a rear tailgate when there is one, and an intermediate bar 220.

Consequently, in the example represented in FIGS. 13 and 14, the vehicle contains two separate convertible tops: a front convertible top 100a placed between the windshield pillar 210 and the central bar 220 and a rear convertible top 100b placed between the central bar 220 and the rear bar 230.

Of course, the invention also applies to the vehicle containing only one removable convertible top 100.

The central part of each convertible top 100 is preferably formed by a sealing and flexible canvas 110. Each convertible top 100 comprises on each left and right side, i.e. in lateral extension toward the outside of the longitudinal edges 112 and 114 of the central portion of the canvas 110, a rigid curved reinforcement 130, 140. These lateral reinforcements 130, 140 are rigid, substantially thin and pre-formed to follow the shape of the rounded part of the bars 210, 220 and 230 to which the convertible top 100 is intended to be attached. The lateral reinforcements 130 and 140 make it possible, firstly to stiffen the convertible top in the shape of the rounded part of the bar and avoid the convertible top floating when the vehicle is driven, and secondly to handle the convertible top 100 more easily, particularly for the characteristic tensioning of the convertible top 100, as described below.

As previously indicated, according to the invention, the convertible top 100, specifically the rigid lateral reinforcements 130, 140, is furthermore provided on its opposite lateral edges 112, 114, parallel to the longitudinal reinforcements 120, with sets of respective hooks 150 adapted for cooperating with complementary hooking structures 250 provided on the vehicle. The hooks, or pegs or hooking members or tensioning members 150, and the complementary hooking structures 250 are adapted for automatically tensioning the canvas 110 by elastically tensioning the portion of canvas located between the two sets of hooks 150, when these two sets of hooks 150 are engaged with the complementary hooking structures 250 provided on the vehicle.

As represented specifically in FIGS. 1 to 4, the hooks 150 are preferably oriented perpendicularly to the longitudinal direction of the vehicle to provide the desired tension of the canvas 110.

In particular, provision is made for hooking structures 250 at each bar 210, 220 and 230. Thus, each bar 210, 220, 230 includes in the left part and the right part, i.e. on either side of the longitudinal axis O-O represented in FIG. 1, two symmetrical hooks 250, or pegs or complementary hooking or tensioning members, such that two symmetrical hooks 150 of the convertible top 100 couple to the hooks 250 of each bar, as illustrated particularly in FIGS. 2 and 8. And provision is also made, preferably, for hooking means 250 and 150 in the front part of the convertible top 100 for attaching to the corresponding pillar 210 of the windshield, and in the rear part of the convertible top 100 for attaching to the central bar 220. In a sense, the four hooks 150 are thus positioned at the four corners of the canvas 110 to provide optimal tensioning and stretching of the canvas 110 between two successive bars (FIG. 1).

In a variant represented in FIG. 9, the convertible top 100 can be equipped with a metal wire 190 (steel for example) sunk into the convertible top 100 that extends across the whole width of the canvas 110 and connects two pegs 150 of one and the same side 116 or 118 of the canvas (i.e. along a front 116 or rear 118 transverse edge) (perpendicular to the longitudinal direction O-O), to optimize the tension and flattening against the bars 210, 220, 230 and to provide a seal. More precisely, provision is preferably made for such a wire 190 on each of the transverse edges 116 and 118 respectively.

Thus, the ratcheting of the hooks 150 and 250 tensions the canvas 110 of the convertible top 100 when the latter is unrolled and the convertible top 100 is put in position on the bars 210, 220 and 230, as described below.

FIG. 3 represents a similar view to FIG. 2, but corresponding to the position of the convertible top 100 just before hooking of the second rigid lateral reinforcement 130, to illustrate the fact that before hooking, the canvas 110 is not yet tensioned (i.e. completely tautened.)

FIG. 4 represents a partial magnified view of FIG. 3 to illustrate cooperation of the hooks 150 provided on the canvas 110 and the hooks 250 provided on the vehicle 200. More precisely, FIG. 4 illustrates the notion of downward rotation (illustrated by the arrow F) to perform the hooking/ratcheting.

In the context of the invention, provision is also preferably made for sealing means 160 between the edge of the canvas 110, or the convertible top 100, and the support structure of the convertible top 100 formed on the vehicle, in particular by the bars 210, 220 and 230.

More precisely, as illustrated in FIG. 7, the sealing means 160 preferably comprise a continuous sealing means formed of a flexible internal bead 162 made of rubber, or any equivalent material, on which the rim of the convertible top 100 comes to rest. As seen in FIG. 7, the sealing means 160 further comprise, preferably, an external bead 164 interrupted at right angle to the junction between the flexible part 110 and the rigid parts 130, 140, at the location of the hooking means 250.

Once thus put in place on the bars 210, 220, 230 and tensioned by cooperation of the canvas 110 with the lateral reinforcements 130, 140, specifically between the hooking means 150, 250, the convertible top 100 is attached at its end, preferably, by any appropriate means, for example by a press stud 170 cooperating with the complementary part of the same stud attached facing it on a corresponding bar 210, 220 or 230 (FIG. 8).

Of course, attachment means can be formed by any other appropriate means, for example devices known as "spring clips", namely hooks with a spring and lever for greater safety. Such attachment means of spring clip type are known to those skilled in the art and will therefore not be described in detail below.

Similarly, the attachment means can be formed by buttons 172 of "Tenax"(trademark) type, as represented in FIG. 11. Such attachment buttons have the main advantages of being solid, inexpensive, easy to use and quick to attach and remove when handling the convertible top.

Any other equivalent attachment means can of course be used as a replacement for the spring clips, press studs 170 or buttons 172 of "Tenax" (trademark) type without departing from the scope of the present invention.

Advantageously, the convertible top 100 is equipped with a plurality of attachment means (FIG. 12) arranged in such a way as to be distributed over the whole width of the convertible top 100, i.e. along the bars on which the convertible top 100 is intended to be positioned, to ensure the reinforced sealed holding of the convertible top 100 on the bars 210, 220 and 230. In a particular embodiment (FIG. 9), the attachment means 172 are arranged at the ends of strips or straps 174 projecting from the lower surface of the canvas 110, so as to allow the attachment of the convertible top 100 below the sealed area between the canvas 110 and the bars 210, 220 and 230 (FIG. 12).

More precisely, FIG. 12 illustrates four attachment points 170 or 172 distributed along a bar 210, 220 or 230, substantially along the longitudinal reinforcements 120, at the end of the associated fabric strips 174 to attach to the bar and under the sealing surface.

Moreover, FIGS. 9 and 12 show a rigid lateral reinforcement 140 attached using an attachment 170 or 172 according to the same principle as the canvas 110.

The convertible top 100 in accordance with the present invention thus offers many advantages compared to the prior art.

In particular, the following advantages may be highlighted:

Firstly, the invention is particularly simple to manufacture and inexpensive;

Next, the invention is easy to install by a single person in a short time, typically a few minutes;

Moreover, once removed the convertible top can be rolled up and optionally stored in an associated case, and as it takes up little space, it can be easily stored in a trunk or any dedicated space of the vehicle.

Of course, the present invention is not limited to the particular embodiment that has just been described but extends to any variant in accordance with its spirit.

As illustrated in FIGS. 15 and 16, the convertible top 100 can also include transparent lateral flaps 135 to protect passengers from rain or side-winds on the upper part of the vehicle's doors.

Such flaps 135 can be made from transparent plastic walls attached to the base of the rigid parts 130, 140 shaped to follow the shape of the convertible top 100 (FIG. 15).

The flaps 135 can be attached by any appropriate means either to the structure of the convertible top 100 or to the structure of the vehicle, for example by press studs, zip fastener or any other equivalent means.

By way of example, each rigid part 130, 140 of the convertible top 100 can include a zip fastener part and each flap 135 can include a complementary part of the zip fastener. In all cases, preferably, a sealing principle is provided between the rigid parts 130, 140 of the convertible top and the fastening means associated with the flaps 135 in this area.

The flaps 135 are preferably movable between an unfurled position, illustrated in FIG. 15, wherein the flaps 135 cover the lateral panels of the vehicle and a folded position by rolling toward the convertible top 100, the flaps 135 being held in the rolled, folded position by any appropriate means, for example by attachment strips of Velcro (trademark) type or any equivalent means, for example press studs.

Similarly, provision is preferably made for means for holding the flaps 135 in the unfurled position, as illustrated in FIG. 15, for example in the form of press studs or else two strips of complementary Velcro type, or any equivalent means.

Those skilled in the art will easily understand the operation of the convertible top 100 in accordance with the invention upon reading the previous description.

To remove the convertible top 100, one unclips the attachment means 170 and/or 172 attaching the convertible top 100 to the bars 210, 220, 230.

One rolls the convertible top 100 around itself from a first side of the car, taking in hand the corresponding lateral reinforcement 130 or 140 so that the set of associated hooks 150, 250 detaches by performing a rotation/rolling of the lateral reinforcement of the convertible top upward. In doing this the hooks 150, 250 detach.

One continues to roll up the convertible top 100 until the hooks 150, 250 of the other side of the vehicle unhook and one finishes the rolling-up before storing the convertible top 100 in a storage case or any other appropriate place.

To install a convertible top 100, one proceeds as follows. First, one unrolls the convertible top 100 from a first side, making sure that the rounded rigid part 130 or 140 is opposite the rounded part of the corresponding bar. Specifically, one positions the first hooks 150 of a first lateral reinforcement 130 or 140 in the associated hooks 250 of the corresponding bars (respectively front and rear simultaneously), then one unrolls the convertible top 100 until the hooks 150 of the second lateral reinforcement 140 or 130 are positioned substantially at the associated hooks 250 of the corresponding bars up to the opposite lateral side of the vehicle.

As illustrated in FIG. 4, one then couples the complementary hooks 150 and 250 (respectively front and rear simultaneously) of said opposite side by downward rotation/clipping (arrow F), which ensures the full tensioning of the convertible top 100 on the associated bars.

One then attaches the attachment means (press studs 170, buttons 172 of "Tenax" type and/or any equivalent means) on each side of the vehicle and along the bars, as illustrated for example in FIG. 12, which ensures the holding of the convertible top 100 on the corresponding bars and provides the seal.

In FIG. 2, reference number 170 indicates optional means for attaching the external lateral edge of the rigid parts 130, 140 of the convertible top to the vehicle structure.

The invention claimed is:

1. A removable convertible top (100) for a convertible vehicle, including:
   a flexible sealing canvas (110) provided with longitudinal reinforcements (120) the ends of which are adapted for resting on bars (210, 220, 230) of a vehicle,
   rigid curved lateral reinforcements (130, 140), arranged on the opposite sides of the canvas (110), parallel to the longitudinal reinforcements (120), and respectively provided with sets of hooks (150) adapted for cooperating with complementary hooking structures (250) provided on the vehicle,
   said canvas (110) and said lateral reinforcements (130, 140) cooperating so as to automatically tension the canvas (110), by elastically tensioning the portion of the canvas (110) located between the two sets of hooks (150), when these two sets of hooks (150) are engaged with the hooking structures (250) provided on the vehicle,
   wherein the removable convertible top includes means (170, 172) for attaching to the structure of a vehicle based on press studs.

2. The convertible top according to claim 1, characterized by the fact that the longitudinal reinforcements (120) extend parallel to the longitudinal direction of the vehicle, whereas the respective sets of hooks (150) are provided at the ends of the lateral edges (112, 114) of the canvas (110) and are oriented perpendicularly to the longitudinal direction of the vehicle.

3. The convertible top according to claim 1, characterized in that the attachment means (170, 172) are regularly distributed along the convertible top (100) to be attached at the associated bars (210, 220, 230).

4. The convertible top according to claim 1, characterized in that the attachment means (170, 172) are arranged at fabric strips projecting from the lower surface of the canvas (110) of the convertible top (100).

5. A vehicle, characterized by the fact that it is equipped with at least one convertible top (100 including:
   a flexible sealing canvas (110) provided with longitudinal reinforcements (120) the ends of which are adapted for resting on bars (210, 220, 230) of a vehicle,
   rigid curved lateral reinforcements (130, 140), arranged on the opposite sides of the canvas (110), parallel to the longitudinal reinforcements (120), and respectively provided with sets of hooks (150) adapted for cooperating with complementary hooking structures (250) provided on the vehicle,
   said canvas (110) and said lateral reinforcements (130, 140) cooperating so as to automatically tension the canvas (110), by elastically tensioning the portion of the canvas (110 located between the two sets of hooks (150), when these two sets of hooks (150) are engaged with the hooking structures (250) provided on the vehicle,
   wherein said vehicle includes sealing means (160) between the periphery of said at least one convertible top (100) and the structure of the vehicle and the sealing means (160) comprise two beads (162, 164), one continuous and one interrupted, at the hooking structures (250).

6. The vehicle according to claim 5, characterized by the fact that it is equipped with two convertible tops (100) each including:
   a flexible sealing canvas (110) provided with longitudinal reinforcements (120) the ends of which are adapted for resting on bars (210, 220, 230) of a vehicle,
   rigid curved lateral reinforcements (130, 140), arranged on the opposite sides of the canvas (110), parallel to the longitudinal reinforcements (120), and respectively provided with sets of hooks (150) adapted for cooperating with complementary hooking structures (250) provided on the vehicle,
   said canvas (110) and said lateral reinforcements (130, 140) cooperating so as to automatically tension the canvas (110), by elastically tensioning the portion of the canvas (110) located between the two sets of hooks (150), when these two sets of hooks (150) are engaged with the hooking structures (250) provided on the vehicle.

7. The vehicle according to claim 5, characterized by the fact that the longitudinal reinforcements (120) of said at least one convertible top (100) are formed by rings, the ends of which are placed in steps (212) provided on the vehicle, the ends of the rings being preferably flattened so that each convertible top (100) is not thicker in relation to the structure of the vehicle.

8. The convertible top according to claim 5, characterized by the fact that it includes means (170, 172) for attaching said at least one convertible top to the structure of a vehicle based on press studs.

9. The vehicle according to claim 5, characterized by the fact that it includes means (170, 172) for attaching said at least one convertible top to the structure of a vehicle based on "Tenax"-type buttons.

10. The vehicle according to claim 6, characterized by the fact that the longitudinal reinforcements (120) of each convertible top (100) are formed by rings, the ends of which are placed in steps (212) provided on the vehicle, the ends of the rings being preferably flattened so that each convertible top (100) is not thicker in relation to the structure of the vehicle.

11. The vehicle according to claim 5 wherein the longitudinal reinforcements (120) extend parallel to the longitudinal direction of the vehicle, whereas the respective sets of hooks (150) are provided at the ends of the lateral edges (112, 114) of the canvas (110) and are oriented perpendicularly to the longitudinal direction of the vehicle.

12. The vehicle according to claim 5, wherein said vehicle includes means (170, 172) for attaching the convertible top to the structure of the vehicle.

13. The convertible top according to claim 12, characterized in that the attachment means (170, 172) are regularly distributed along the convertible top (100) to be attached at the associated bars (210, 220, 230).

14. The convertible top according to claim 12, characterized in that the attachment means (170, 172) are arranged at fabric strips projecting from the lower surface of the canvas (110) of the convertible top (100).

15. A removable convertible top (100) for a convertible vehicle, including:

a flexible sealing canvas (110) provided with longitudinal reinforcements (120) the ends of which are adapted for resting on bars (210, 220, 230) of a vehicle, rigid curved lateral reinforcements (130, 140), arranged on the opposite sides of the canvas (110), parallel to the longitudinal reinforcements (120), and respectively provided with sets of hooks (150) adapted for cooperating with complementary hooking structures (250) provided on the vehicle, said canvas (110) and said lateral reinforcements (130, 140) cooperating so as to automatically tension the canvas (110), by elastically tensioning the portion of the canvas (110) located between the two sets of hooks (150), when these two sets of hooks (150) are engaged with the hooking structures (250) provided on the vehicle, wherein the removable convertible top includes means (170, 172) for attaching to the structure of a vehicle based on "Tenax" type buttons.

16. The convertible top according to claim 15, characterized by the fact that the longitudinal reinforcements (120) extend parallel to the longitudinal direction of the vehicle, whereas the respective sets of hooks (150) are provided at the ends of the lateral edges (112, 114) of the canvas (110) and are oriented perpendicularly to the longitudinal direction of the vehicle.

17. The convertible top according to claim 15, characterized in that the attachment means (170, 172) are regularly distributed along the convertible top (100) to be attached at the associated bars (210, 220, 230).

18. The convertible top according to claim 15, characterized in that the attachment means (170, 172) are arranged at fabric strips projecting from the lower surface of the canvas (110) of the convertible top (100).

* * * * *